US009491106B2

(12) United States Patent
Le Pallec et al.

(10) Patent No.: US 9,491,106 B2
(45) Date of Patent: Nov. 8, 2016

(54) NON-INTRUSIVE METHOD FOR SYNCHRONIZING MASTER AND SLAVE CLOCKS OF A PACKET-SWITCHED NETWORK, AND ASSOCIATED SYNCHRONIZATION DEVICES

(75) Inventors: Michel Le Pallec, Nozay (FR); Dinh Thai Bui, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 95 days.

(21) Appl. No.: 13/877,547

(22) PCT Filed: Oct. 19, 2011

(86) PCT No.: PCT/EP2011/068266
§ 371 (c)(1),
(2), (4) Date: May 6, 2013

(87) PCT Pub. No.: WO2012/052481
PCT Pub. Date: Apr. 26, 2012

(65) Prior Publication Data
US 2013/0215753 A1 Aug. 22, 2013

(30) Foreign Application Priority Data
Oct. 22, 2010 (EP) .................................... 10306154

(51) Int. Cl.
*H04L 12/26* (2006.01)
*H04L 12/841* (2013.01)
*H04J 3/06* (2006.01)

(52) U.S. Cl.
CPC ........... *H04L 47/283* (2013.01); *H04J 3/0667* (2013.01); *H04J 3/0673* (2013.01)

(58) Field of Classification Search
USPC ........................................................ 370/235
See application file for complete search history.

(56) References Cited

U.S. PATENT DOCUMENTS

2001/0036181 A1* 11/2001 Rogers .......................... 370/389
2008/0089364 A1* 4/2008 Barry et al. ................... 370/517

(Continued)

FOREIGN PATENT DOCUMENTS

CN 1787491 6/2006
CN 1997027 7/2007

(Continued)

OTHER PUBLICATIONS

Dinh Thai Bui et al; Packet Delay Variation Management for a Better IEEE1588V2 Performance; 2009 IEEE International Symposium on Precision Clock Synchronization for Measurement, Control and Communication; ISPCS Oct. 12-16, 2009; Brescia, Italy; pp. 1-6; XP002632262; 2009 IEEE International Symposium on Precision Clock Synchronization for Measurement, Control and Communication; ISPCS 2009; IEEE Piscataway, NJ; USA; DOI: 10.1109/ispcs.2009.5340212; ISBN: 978-1-4244-4391-8; Retrieved from the internet:URL:http//ieeexplore.org/stamp/stamp.jsp?tp=&arnumber=5340212&tag=1.
Dinh Tha Bui et al; Protocol Agnostic On-Path Supports: for IEEE 1588V2 deployment inIPSec environment; 2010 IEEE International Symposium on Precision Clock Synchronization for Measurement, Control and Communication; (ISPCS 2010) Sep. 27 through Oct. 1, 2010; Portsmouth, NH, USA; pp. 129-134; XP002632263; (ISPCS 2010) 2010 IEEE Piscataway, NJ, USA, DOI: 10.1109/ispcs.20105609804; ISBN: 978-1-4244-5978-0; Retrieved from the Internet: URL:http://ieeexplore.ieee.org/stamp/stamp.jsp?tp=&arnumber=5609804; [retrieved on Apr. 6, 2011].

(Continued)

Primary Examiner — Edan Orgad
Assistant Examiner — Sithu Ko
(74) Attorney, Agent, or Firm — Patti & Malvone Law Group, LLC

(57) ABSTRACT

A method is devoted to the synchronization of master (HM) and slave (HE) clocks of a packet-switched network, capable of exchanging synchronization packet flows via intermediary equipment (E1-E9) of that network, connected to one another. This method comprises the following steps:

i) determining within each piece of intermediary equipment (E1-E9) the instant transit times of packets belonging to a first group of packets of at least one chosen flow of synchronization packets, then acting on packets from a second group of packets of that chosen flow so that their instant transit times within each piece of intermediary equipment (E1-E9) are each roughly equal to a corresponding maximum transit time, and ii) filtering the packets of the chosen flow at least within the slave clock (HE) in order to synchronize it to the master clock (HM) by means of the processed packets of that chosen flow's second group.

20 Claims, 2 Drawing Sheets

(56) References Cited

U.S. PATENT DOCUMENTS

2010/0278055 A1* 11/2010 Barry et al. ............... 370/252
2011/0134766 A1* 6/2011 Zampetti et al. ........... 370/252

FOREIGN PATENT DOCUMENTS

| CN | 101517968 | 8/2009 |
| CN | 100592710 | 2/2010 |
| CN | 101803268 | 8/2010 |
| EP | 2228927 | 9/2010 |

OTHER PUBLICATIONS

Dinh Tha Bui et al; Taks 2.4 mid-term report on Synchronization Service in Carrier-Grade Ethernet Environments (M24); Internet Citation; Feb. 25, 2010; pp. 1-52; XP002662902; Celtic Telecommunication Solutions; Retrieved from the Internet: URL:http://projects.celtic-initiative.org/tiger2/TIGER2%20m24%20%28FINAL%29.PDF; [retrieved on Nov. 10, 2011].

* cited by examiner

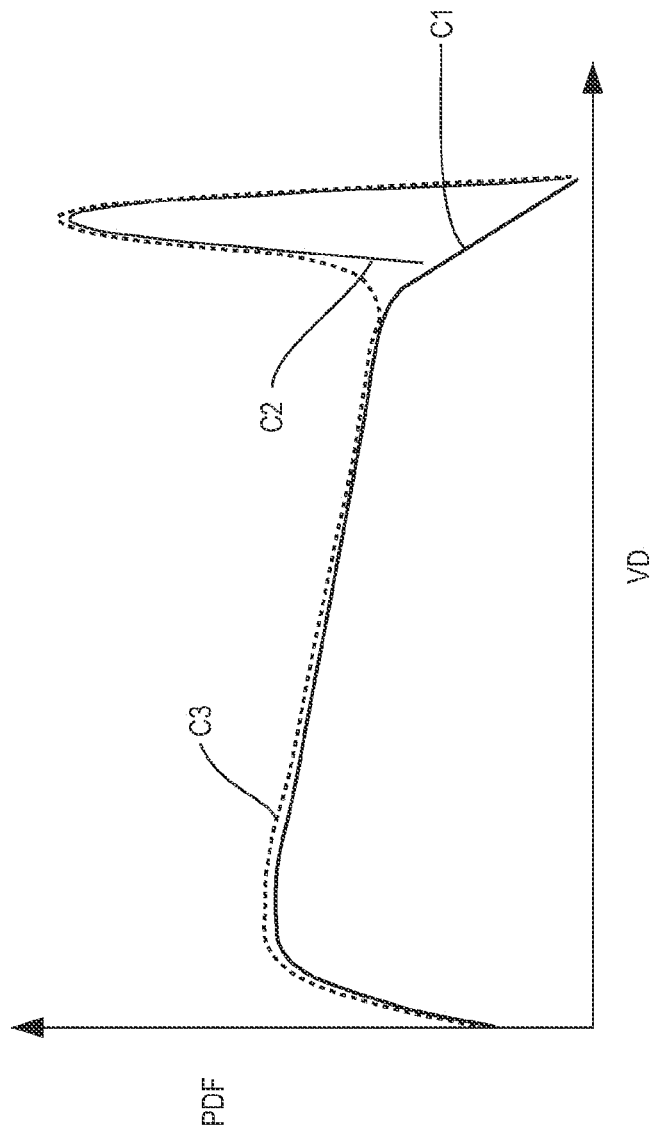

NON-INTRUSIVE METHOD FOR SYNCHRONIZING MASTER AND SLAVE CLOCKS OF A PACKET-SWITCHED NETWORK, AND ASSOCIATED SYNCHRONIZATION DEVICES

CROSS REFERENCE

This application claims the benefit of European patent application No. EP10306154, filed Oct. 22, 2010 and the benefit of PCT patent application no. PCT/EP2011/068266, filed Oct. 19, 2011, the respective contents of which are hereby incorporated by reference in their entirety.

TECHNICAL FIELD

The invention pertains to packet-switched networks, and more specifically, the synchronization of master and slave clocks belonging to a packet-switched network.

Here, the term "packet-switched network" refers to a communication network in which digital messages are transmitted in the form of data packets from a source address to a recipient address by switching or routing operations. It should be noted that the communication medium may be wired or wireless.

BACKGROUND

The distribution of a reference time or frequency between a master clock and a slave clock is carried out through nodes of a packet-switched network.

Here, the term "node" refers to any type of network equipment (or element) representing a switching point or routing point. It may therefore, for example, be a switch or a router.

Furthermore, the term "master clock" refers here to an element capable of transmitting timestamped synchronization messages/packets. Such an element may be, for example, an IEEE 1588V2 server. A master clock may be integrated into, or co-located with, a network equipment or element (such as a switch or router, for example).

Additionally, the term "master clock" refers to an element capable of receiving and processing timestamped messages/packets in order to control a local clock providing a reference frequency or time. Such an element may be, for example, integrated into, or co-located with, a base station (if in a wireless network).

In order to enable the synchronization of the slave clock to a master clock, the master and slave clocks must exchange synchronization messages via intermediary nodes of the packet-switched network. By way of a nonlimiting example, these synchronization messages may be messages of the IEEE protocol 1588V2 (or PTPV2 for "Precision Time Protocol release 2") in both directions of communication, meaning from the master clock to the slave clock ("SYNC" messages) and from the slave clock to the master clock ("DELAY_REQ" messages). These synchronization messages contain timestamp information enabling time synchronization of the slave clock to the master clock, based on which a frequency synchronization (or tuning) may be derived. As a reminder, the frequency may be derived from the time, but the reverse cannot.

As is known to the person skilled in the art, the accuracy of the time synchronization of a slave clock compared to a master clock depends both on the asymmetry of the transmission times of the synchronization messages' packets (hereafter known as the synchronization packets) belonging to a first flow (from the master clock to the slave clock) and to a second flow (from the slave clock to the master clock), and on the packet jitter of these synchronization packets. As a reminder, packet jitter mainly depends on the variation in the time it takes to transmit that packet over the network elements.

Unfortunately, a packet's transit time over a network element depends heavily on the level of traffic, which is not predictable. As a result, a time synchronization accuracy on the order of, or less than, a microsecond, particularly required for the use of mobile networks (base stations), becomes difficult to control due to this dependency.

In order to overcome these dependencies, the IEEE standard 1588V2 proposes to associate with each intermediary node a transparent clock, tasked with determining the local transit time of the synchronization packets of each synchronization message of a first or second flow (by finding the difference between their local departure time and their local arrival time) and adding that determined local transit time to the current value of a so-called correction field of the synchronization message in question.

The aforementioned addition operation involves writing into the correction field of the packet that is in transit through a network node. This intrusive action is a violation of the principle of network layer isolation, and may potentially lead to security and/or integrity problems with the transmitted information. Additionally, the updating of the correction field within each node, carried out by a transparent clock, may represent a complex operation in a large stack of protocol layers supporting the synchronization packets. By way of example, whenever the synchronization packets are transported by a pseudo-wire Ethernet technology (defined by the rule RFC 4448), the protocol layer stack may be IEEE1588V2 on UDP on IP on Ethernet on PW ("Pseudo-wire") on MPLS ("MultiProtocol Label Switching") on a transport layer. As a result, such a stack raises the problem of locating the correction field within the packet, as well as updating it, an operation that requires newly calculating the is value of the "checksum" field(s) of the packet in question.

In order to avoid violating the aforementioned protocol layers, it has been proposed that each intermediary node transmit to the slave clock, potentially via a management equipment, the transit time of each synchronization message that it received locally. Unfortunately, the solution suffers from a genuine problem with scaling.

Therefore, there is a need to enable the synchronization of master and slave clocks of a packet-switched network in a nonintrusive fashion (avoiding writing to the correction field), meaning without the protocol layers being violated.

SUMMARY

According to a first aspect, the invention proposes a method, dedicated to synchronizing master and slave clocks of a packet-switched network, capable of exchanging synchronization packet flows with one another via intermediary equipments (or nodes) of that network that are connected to one another.

It should be noted that this method relies on separating the synchronization flows into two distinct groups of packets. The packets of a flow's first group are chosen so that their instant transit times measured within an intermediary equipment (or node) are comparable to (or approach) those of the second group's packets of that same flow, so that an alignment of instant transit times of the second group's packets over a maximum transit time (or reference time) is possible.

This method more specifically comprises the following steps:

i) determining within each piece of intermediary equipment the instant transit times of packets belonging to a first group of packets of at least one chosen flow of synchronization packets, then acting on packets from a second group of packets of that chosen flow so that their instant transit times within each piece of intermediary equipment are each roughly equal to a corresponding maximum transit time, and ii) filtering the packets of the chosen flow at least within the slave clock in order to synchronize the slave clock to the master clock by means of the second group's processed packets.

The method may comprise other characteristics that may be taken separately or in combination, and in particular:

during step (i), within each intermediary equipment, the maximum transit time of the packets of the chosen flow's second group may be determined based on the instant transit times of the packets of the chosen flow's first group;

➤ during step (i), within each intermediary equipment, one may determine a number $K_{ij}$ of the successive packets of the chosen flow's first group that are to be used to determine an instant transit time representative of the instant transit times of the second group's packets and a number $N_{ij}$ of packets of the chosen flow's second group, that are to be processed in order to present the maximum transit time, as a function of a correlation of instant transit times between packets of the first and second groups of the chosen flow;

one may provide a step (iii) consisting of determining, for each intermediary equipment and for each chosen flow, a refined (optimal) number $K'_{ij}$ of successive packets of the first group, a refined (optimal) number $N'_{ij}$ of packets of the second group, and a refined maximum packet transit time, by analyzing a correlation of instant transit times between packets of the first and second groups of the chosen flow within the intermediary equipment in question, then using these refined (optimal) numbers $K'_{ij}$ and $N'_{ij}$ and each refined maximum packet transit time, within the corresponding intermediary equipment;

➤ during step (i), each correlation of transit time between each chosen flow's packets may be made within each intermediary equipment;

➤ one may determine during step (iii) a first frequency of transmission of a first type of synchronization message within a first chosen flow from the master clock to the slave clock, a second transmission frequency of a second type of synchronization message within a second chosen flow from the slave clock to the master clock, and, for each intermediary equipment, a refined number $K'_{ij}$ of successive packets of the first group, a refined number $N'_{ij}$ of packets of the second group, and a maximum refined packet transit time, as a function of the correlations of instant transit times between packets of the first and second groups, for each of the intermediary equipments and for each of the first and second flows;

➤ during step (iii), for each of the chosen first and second flows, a corresponding total transit time may be calculated for all of the intermediary equipments, by adding together their respective maximum packet transit times, in order to transmit to the master clock and/or the slave clock these two totaled transit times so that it/they can correct an asymmetry in the transmission times of the synchronization packets of the first and second flows;

during step (ii), one may also filter the packets of the chosen flow within the master clock in order to synchronize the slave clock to the master clock by means of the processed packets of the second group of that chosen flow;

during step (ii), one may determine within at least one of the master and slave clocks the synchronization packets that feature a variation in transmission time comprised within a chosen interval.

According to a second aspect, the invention proposes a first device, dedicated to synchronizing master and slave clocks of a packet-switched network, capable of exchanging synchronization packet flows with one another via intermediary equipments of that network that are connected to one another. This first device is operative to determine for one of the intermediary equipments instant transit times of packets belonging to a first group of packets of at least one chosen flow of synchronization packets, then to act on packets of a second group of that flow's packets so that their instant transit times within the intermediary equipment is roughly equal to a corresponding maximum transit time.

This first device may also be configured to determine within its intermediary equipment the maximum transit time of the packets of the chosen flow's second group based on instant transit times of the packets of the chosen flow's first group.

Furthermore, this the first device may also be operative to determine for its intermediary equipment a number $K_{ij}$ of successive packets of the chosen flow's first group, which are to be used to determine an instant transit time representative of the instant transit times of the second group's packets, and a number $N_{ij}$ of packets of the chosen flow's second group, which are to be processed, as a function of a correlation of instant transit times between packets of the chosen flow's first and second groups. In this situation, the first device may also be operative to determine each correlation of instant transit times between packets of each chosen flow's first and second groups for its intermediary equipment.

According to a third aspect, the invention proposes a second device, dedicated to synchronizing a slave clock of a packet-switched network to a master clock of that same network, the master and slave clocks being capable of exchanging synchronization packet flows with one another via intermediary equipments of the network that are connected to one another. This second device is operative to filter packets belonging to a second group of packets of a chosen flow, received at least by the slave clock and having been processed by each intermediary equipment so that their instant transit time within each intermediary equipment is roughly equal to a maximum transit time, in order to enable a synchronization of the slave clock to the master clock by means of these packets of the second group.

This second device may also be operative to determine, for the slave clock, the synchronization packets that feature a variation in transmission time comprised within a chosen interval.

According to a fourth aspect, the invention proposes a third device, dedicated to synchronizing master and slave clocks of a packet-switched network, capable of exchanging synchronization packet flows with one another via intermediary equipments (or nodes) of that network that are connected to one another. This third device is operative to determine, for each intermediary equipment and for each chosen flow, a refined (optimal) number $K'_{ij}$ of successive packets of the first group, a refined (optimal) number N'ij of packets of the second group and a maximum refined transit time of packets, by analyzing a correlation of instant transit times between packets of the first and second groups of the chosen flow within the intermediary equipment in question, in order for these refined (optimal) numbers K'ij and N'ij and each refined maximum transit time of packets to be used within the corresponding intermediary equipments.

This third device may also be operative to determine a first transmission frequency of a first type of synchronization message within a first chosen flow from the master clock to the slave clock, a second transmission frequency of a second type of synchronization message within a second chosen flow from the slave clock to the master clock, and for each intermediary equipment, a refined number K'ij of the successive packets of the first group, a refined number N'ij of packets of the second group, and a refined maximum packet transit time, based on analyzing the correlations of instant transit times between packets of the first group of the chosen flow, for each of the intermediary equipment and for each of the first and second flows.

This third device may also be operative to calculate, for each of the chosen first and second flows, a corresponding total transit time for all of the intermediary equipment, by adding together their maximum respective packet transit times, in order to transmit to the master clock and/or the slave clock these total transit times so that it/they can correct an asymmetry in the transmission times of the synchronization packets of the first and second flows.

According to a fifth aspect, the invention proposes a system for synchronizing master and slave clocks of a packet-switched network, capable of exchanging synchronization packet flows with one another via intermediary equipment of that network that are connected to one another. This system comprises first devices of the same type described above and capable of respectively being associated with the intermediary equipment, second devices of the same type presented above and capable of respectively being associated with the master and slave clocks, and a third device of the same type described above and capable of being coupled with the intermediary equipments, to the master clock and the slave clock.

BRIEF DESCRIPTION OF THE DRAWINGS

Other characteristics and advantages of the invention will become apparent upon examining the detailed description below, and the attached drawings, wherein:

FIG. 2 depicts, in the form of a diagram, an example course of a probability density function (PDF), on a logarithmic scale, as a function of the packet's transmission Time Variation (VD). The graph C1 pertains to the packets of the first groups of synchronization packets, the graph C2 pertains to the packets of the second groups of synchronization packets, and the graph C3 pertains to the conjunction of the packets of the first and second groups of synchronization packets.

Figure 1:
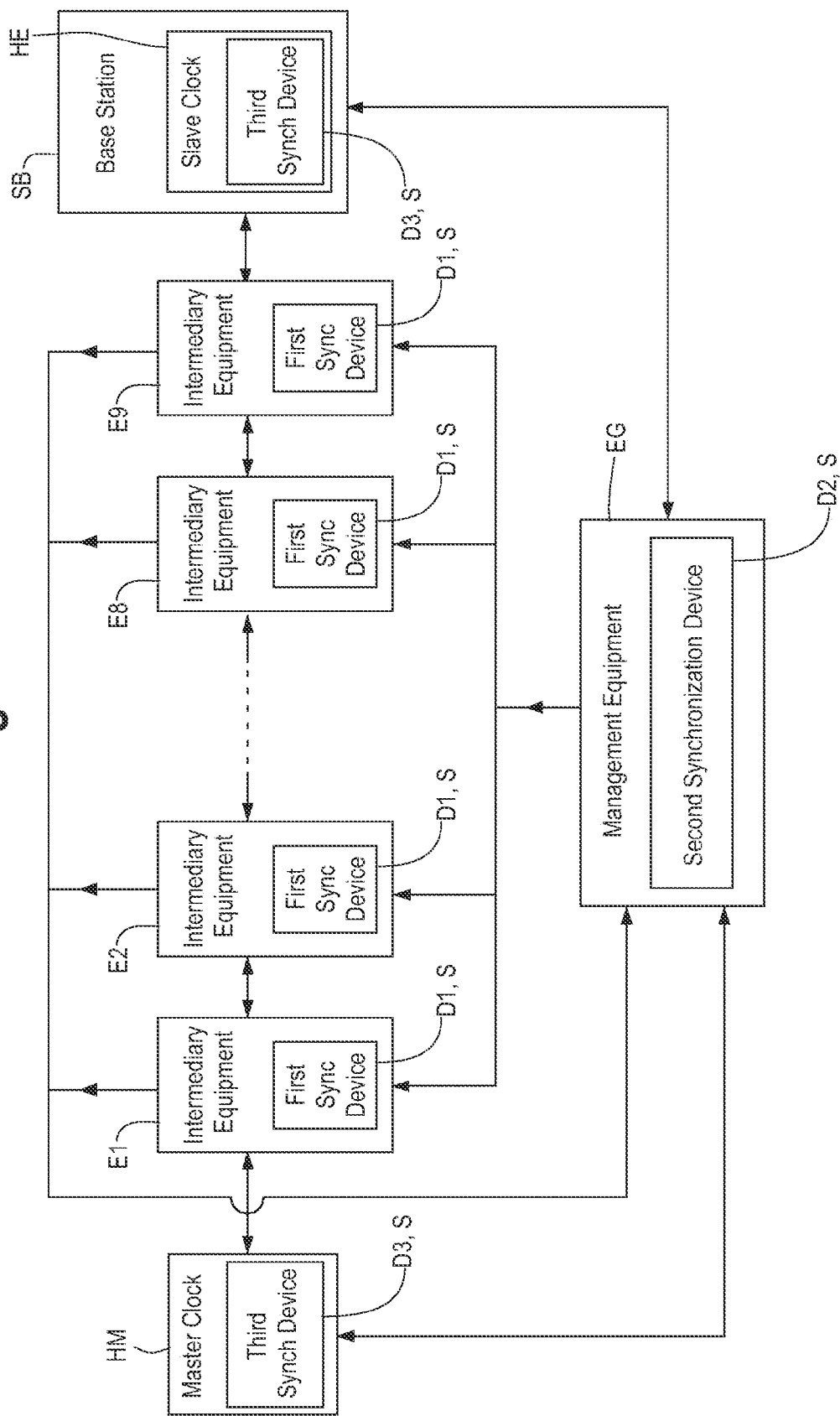
FIG. 1 schematically and functionally depicts intermediary nodes and master and slave clocks of a packet-switched network connected to one another, within which are installed synchronization devices constituting an example embodiment of the inventive synchronization system.

The appended drawings constitute part of the description of the invention as well as contributing to the definition of the invention, if necessary.

DETAILED DESCRIPTION

It is an object of the invention to enable the non-intrusive synchronization of a slave clock (HE) of a packet-switched network compared to a master clock (HM) of that same packet-switched network.

In what follows, it is assumed, by way of an illustrative example, that the slave clock (HE) is integrated into a base station (SB) of a LTE ("Long Term Evolution") network. However, the invention is not limited to this type of scenario.

It should be noted that the invention pertains to any type of packet-switched network, whether wired or wireless, that comprises intermediary equipments (or nodes) (Ei) within which the incoming and outgoing packets may be assigned timestamps intended to report their departure and arrival times with respect to a local clock. It should be noted that the invention is particularly well-suited, though not in a limiting fashion, to LTE networks using IPSec encryption, for which intrusion at an intermediary transmission stage is difficult.

As depicted in of nonlimiting fashion in FIG. 1, a (packet-switched) network comprises a multiplicity of communication equipments (or nodes) Ei, HM, and HE, connected to one another in order to enable the transmission of packets, and particularly of synchronization packets defining synchronization messages.

More specifically, such a network includes at least one master clock HM, at least two intermediary equipments Ei (here i=1 to 9 as a purely illustrative example), and at least one slave clock HE (here installed within a base station SB). It should be noted that the intermediary equipments Ei are nodes traversed by packet flows that come from the master clock HM and are intended for the slave clock HE, or vice versa.

In what follows, it is assumed, by way of an illustrative example, the synchronization messages comply with the IEEE standard 1588V2 (or PTPV2). Consequently, the synchronization messages that are transmitted from the master clock HM to the slave clock HE may be of the type "SYNC", and the synchronization messages that are transmitted from the slave clock HE to the master clock HM may be of the type "DELAY_REQ".

According to one aspect, the invention proposes implementing a method of synchronizing master clocks HM and slave clocks HE of a network of the type described above.

This method comprises at least the two main steps (i) and (ii).

A first main step (i) of the method first consists of determining within each of the network's intermediary equipment Ei instant transit times of packets that belong to a first group G1 of packets of at least a chosen flow Fj of synchronization packets.

In order to do so, for each packet of a first group G1 the difference is found between its departure time as stated by a local clock (defined by an output timestamp) and its arrival time as stated by that same local clock (defined by an arrival timestamp).

The first main step (i) of the method continues through an action on packets of a second group of packets G2 of each chosen flow Fj, intended to make their instant transit time within each intermediary equipment Ei roughly equal to a corresponding maximum transit time $Tij_{ref}$. In other terms, the retransmission by an intermediary equipment Ei of each packet of each second group G2 to the next equipment (Ei' (where i' ≠ i) or HE or HM) is delayed so that its transit time within that intermediary equipment Ei is roughly equal to the corresponding maximum transit time $Tij_{ref}$. To do so, one may, for example, use additional memories.

It is understood that a synchronization flow Fj is segmented within each intermediary equipment Ei into an alternating series of packets of a first group G1 (used to determine a maximum transit time $Tij_{ref}$) and packets of a second group G2 (processed so that their local instant transit time is roughly aligned with said maximum transit time $Tij_{ref}$).

It is important to note that each maximum transit time $Tij_{ref}$ may be either predefined and static, or predefined and refinable, or determined by learning at least during the first main step (i) and potentially refinable.

In this latter situation, one may determine, within each intermediary equipment Ei, the maximum transit time $Tij_{ref}$ of the packets of the second group of a chosen flow based on instant transit times of the packets of the first group of that same chosen flow. Preferentially, for each intermediary equipment Ei of the network, a first maximum transit time $Ti1_{ref}$ is determined based on instant transit times within the intermediary equipment in question Ei of packets that belong to a first group G1 of packets of a chosen first flow F1 going from the master clock HM to the slave clock HE (for example, dedicated to SYNC messages), and a second maximum transit time $Ti2_{ref}$ based on instant transit times within the intermediary equipment in question Ei of packets that belong to a first group G1 of packets of a chosen second flow F2 going from the slave clock HE to the master clock HM (for example, dedicated to DELAY_REQ messages).

It should be noted that in the step (i) it is advantageous to determine within each intermediary equipment Ei, firstly, a number Kij of successive packets of a first group G1 of a chosen flow Fj that must be used to determine an instant transit time representative of the instant transit times of the packets of the second group G2 of that chosen flow Fj in order to temporally aligned them roughly to the local maximum transit time $Tij_{ref}$, and secondly, a number Nij of packets of a second group G2 of that same chosen flow Fj that must be to processed (or aligned) to present the maximum transit time $Tij_{ref}$, as a function of a correlation of instant transit times between packets of the first G1 and second G2 groups of that chosen flow Fj.

Here, the phrase "correlation of instant transit times between packets" refers to a direct similarity between instant transit times of packets of a first is group G1 of a given flow Fj and instant transit times of packets of a second group G2 of that same given flow Fj. It should be understood that is assumed here that if successive packets of a first group G1 of a chosen flow Fj have roughly the same local instant transit time over a first reduced interval of time, then the successive packets of a second group G2 of that chosen flow Fj should have roughly the same local instant transit time over a second reduced interval of time.

It should be noted that the numbers Kij and Nij must be greater than or equal to one (1). There chosen as a function of the transmission rate of the synchronization messages/packets of the flow in question (these messages being transmitted by the master clock HM or slave clock HE), a rate which may potentially be determined (or estimated) within an intermediary equipment Ei during a learning phase. Furthermore, the number Nij is preferentially chosen as a function of the behavior over a given interval of time and the variation in different instant transit times of the packets of a first group G1 within an intermediary equipment Ei. The number Kij is also preferentially chosen to be small compared to the number Nij.

It should also be noted that it is currently preferred to perform the analysis of the transit time correlation between packets of each chosen flow Fj within each intermediary equipment Ei. This makes it possible to not transmit over the network, to a centralized analysis entity, all of the local information needed to estimate each correlation of transit time between packets of each chosen flow Fj within each intermediary equipment Ei, which would lead to a relatively large load.

It should also be noted that this initial first step (i) may be implemented by means of first (synchronization) devices D1 which are respectively associated with intermediary equipment Ei.

Here, the word "associated" means both forming an integral part of an intermediary equipment Ei (as depicted) or being coupled directly or indirectly to an intermediary equipment Ei. Consequently, a second (synchronization) device D1 may be constructed in the form of software (or computer) modules, or electronic circuits, or a combination of electronic circuits and software modules.

A second main step (ii) of the method consists of filtering the packets of the chosen flow at least within the slave clock HE in order to synchronize the slave clock HE to the master clock HM by means of the packets of the second group G2 which were processed (temporally aligned) during the first main step (i) by the first devices D1 associated with the different intermediary equipments Ei.

In order to improve the accuracy of the synchronization and/or accelerate the synchronization, it may be advantageous to also filter during step (ii) the packets of the (second) chosen flow F2 within the master clock HM.

As schematically depicted in FIG. 2, in order to perform the filtering one may, for example, determine within at least one of the master HM and slave clocks HE, and preferentially within the latter (HE), the synchronization packets that feature a variation in transmission time comprised within a chosen interval of time.

As the diagram of FIG. 2 shows, the probability density function (PDF) of all of the packets of a chosen flow Fj (here on a logarithmic scale and as a function of packet transmission time variation VD compared to a minimum value), shown as a dotted line C3, results from adding together two contributions: that of the unprocessed packets from the first group G1 of that chosen flow Fj, shown by the solid line C1 (very wide and with an average maximum intensity value), and that of the processed (aligned) packets of the second group G2 of that chosen flow Fj, shown by the solid line C2 (very low width, and with a high maximum intensity value). This results from the fact that the alignment from the first main step (i) is done roughly over a maximum transit time $Tij_{ref}$. Typically, a standard deviation of the packets of the second groups G2 (or width of C2) much lower than that of the packets of the first group G1 (width of C1) may be obtained, typically less than 10 µs for the width C2.

It should be understood that in the presence of such behavior of the packets of a chosen flow Fj, it is relatively easy to filter the packets of the second groups G2. All that is needed is to select the packets whose respective transit times are comprised within a chosen interval set to the variation in maximum packet transmission time VD (compared to a minimum value). The timestamp information carried by the filtered packets may then feed phase lock loops (PLLs) which make it possible to rapidly converge towards the frequency of the master clock HM, and therefore to deduce from it very accurately the current time of the master clock HM if the propagation times over the network's links are known.

It should be noted that this second main step (ii) may be implemented by means of second (synchronization) devices D2 which are respectively associated with the slave HE and master clocks HM (and at least the slave clock alone HE).

Here, the term "associated" refers both to forming an integral part of a slave clock HE or master clock HM (as depicted), and to being directly or indirectly coupled to a slave clock HE or master clock HM. Consequently, a second (synchronization) device D2 may be constructed in the form of software (or computer) modules, or electronic circuits, or a combination of electronic circuits and software modules.

It should also be noted that it is advantageous for the method to comprise a third main step (iii) consisting first of determining, in a centralized fashion within a management equipment EG connected to the intermediary equipments Ei, master clock HM and slave clock HE, for each intermediary equipment Ei and for each chosen flow Fj (and at least the first F1), a refined (optimal) number K'ij of successive packets of the first group, a refined (optimal) number N'ij of packets of the second group, and a maximum refined packet transit time. This determination is made by analyzing a correlation of the instant transit times between packets of the first G1 and second G2 groups of the chosen flow within the intermediary equipment in question Ei.

The third main step (iii) then continues by transmitting to the various intermediary equipments Ei, refined numbers K'ij and N'ij and each maximum refined packet transit time $Tij'_{ref}$ determined for them in view of their being used by the associated first devices D1.

As a reminder, the instant transit time correlations are preferentially determined within each of the intermediary equipments Ei by their associated first devices D1. However, in one variant, they may be determined within the management equipment EG based on information transmitted by the first devices D1 via the associated intermediary equipments Ei.

It should be noted that during the third main step (iii) it is advantageous to determine, firstly, a first transmission frequency FR1 of a first synchronization message type (for example, a SYNC message) in the first chosen flow F1 (from the master clock HM to the slave clock HE), and secondly, a second transmission frequency FR2 of a second type of synchronization message (for example a DELAY_REQ message) within the second chosen flow F2 (from the slave clock HE to the master clock HM), and thirdly, for each intermediary equipment Ei, a refined number K'ij of successive packets of the first group G1, a refined number N'ij of packets of the second group and a maximum refined packet transit time $Tij'_{ref}$ as a function of the correlations of instant transit times between packets of the first G1 and second G2 groups, determined for each of the intermediary equipments Ei and for each of the first F1 and second F2 flows.

The first transmission frequency FR1 is intended to be used by the master clock HM in order to transmit its synchronization messages of the first type (for example of the SYNC type). This frequency is therefore transmitted to it by the management equipment EG, via the network. It should be noted that this usage may potentially be subject to the prior approval of the master clock HM (for example if the IEEE 1588V2 server, which normally serves several hundred slave clocks, is overloaded). By way of example, in a network of the prior art, the first transmission frequency FR1 of the SYNC synchronization messages is generally comprise between 16 and 64 messages per second.

The second transmission frequency FR2 is intended to be used by the slave clock HE in order to transmit its synchronization messages of the second type (for example, DELAY_REQ messages). This frequency is therefore transmitted to it by the management equipment EG, via the network. It should be noted that this usage may potentially be subject to the prior approval of the slave clock HE.

The refined numbers K'ij and N'ij determined for an intermediary equipment Ei for a first F1 or second F2 chosen flow are intended to be used within that intermediary equipment Ei by replacing corresponding numbers Kij and Nij, determined for it (by its first device D1) during the first main step (i).

Likewise, each refined maximum packet transit time $Tij'_{ref}$ determined for an intermediary equipment Ei for a first F1 or second F2 chosen flow is intended to be used within that intermediary equipment Ei by replacing the corresponding maximum packet transit time $Tij_{ref}$ determined for it (by its first device D1) during the first main step (i).

It should be noted that the refined numbers K'ij and N'ij and the refined maximum packet transit times $Tij'_{ref}$ are also advantageously determined as a function of the first transmission frequency FR1 and/or the second transmission frequency FR2. In this situation, they are only transmitted to the intermediary equipments Ei if the master clock HM and potentially the slave clock HE have given their approval with respect to the use of that first transmission frequency FR1 and potentially that second transmission frequency FR2.

It should also be noted that during the third main step (iii) one may also calculate for each of the first F1 and second F2 chosen flows the corresponding total transit time for all of the intermediary equipments Ei (by adding together their respective maximum packet transit times $Tij_{ref}$), then transmit to the master clock HM and/or the slave clock HE these two transit times in it together so that it/they can correct the asymmetry in synchronization packet transmission times, caused by the network elements, of the first F1 and second F2 flows. This is particularly useful in the context of time synchronization (or "time delivery") and not a simple tuning (frequency synchronization).

It should also be noted that this third main step (iii) may be implemented by means of a third (synchronization) device D3 which is associated with the management equipment EG.

Here, the term "associated" refers both to forming an integral part of the management equipment EG (as depicted), and to being directly or indirectly coupled to the management equipment EG. Consequently, a third (synchronization) device D3 may be constructed in the form of software (or computer) modules, or electronic circuits, or a combination of electronic circuits and software modules.

It should also be noted that the first D1, second D2, and third D3 synchronization devices may collectively constitute a synchronization system S intended to be distributed "within" intermediary equipments Ei, at least one master clock HM, at least one slave clock HE, and at least one management device EG.

The invention is not limited to the embodiments of the synchronization method, first, second, and third synchronization devices, and synchronization system described above, which are given only as examples, but rather encompasses all variants that the person skilled in the art may envision within the framework of the claims below.

The invention claimed is:

1. A method for synchronizing master and slave clocks of a packet-switched network, said master and slave clocks exchanging synchronization packet flows with one another via intermediary equipments of that network that are connected to one another, said method comprising the following steps:

i) determining within each intermediary equipment instant transit times of packets belonging to a first group of packets of at least one chosen flow of synchronization packets, determining a maximum transit time of the packets based on said instant transit times, then acting on packets of a second group of said chosen flow so that said instant transit times within each intermediary equipment is within 10 microseconds of said corresponding maximum transit time, and ii) filtering the packets of said chosen flow at least within said slave clock in order to synchronize it to said master clock by means of the processed packets of said second group of that chosen flow.

2. The method of claim 1, wherein during step (i), within each intermediary equipment, one may determine a number $K_{ij}$ of the successive packets of chosen flow's said first group that are to be used to determine an instant transit time representative of the instant transit times of said second group's packets and a number $N_{ij}$ of packets of said chosen flow's second group, that are to be processed in order to present the maximum transit time, as a function of a correlation of instances of time between packets of said first and second groups of said chosen flow.

3. The method of claim 2, wherein a step (iii) is provided consisting of determining, for each intermediary equipment and for each chosen flow, a refined number $K'_{ij}$ of successive packets of said first group and a refined number $N'_{ij}$ of packets of said second group and a refined maximum packet transit time, by analyzing a correlation of instant transit times between packets of the first and second groups of the chosen flow within the intermediary equipment in question, then using these refined numbers $K'_{ij}$ and $N'_{ij}$ and each refined maximum packet transit time, within said corresponding intermediary equipment.

4. The method of claim 3, wherein during step (i), each correlation of transit time between each chosen flow's packets is made within each intermediary equipment.

5. The method of claim 3, wherein during step (iii) a first transmission frequency of a first type of synchronization message is determined within a first chosen flow from said master clock to said slave clock, a second transmission frequency of a second type of synchronization message within a second chosen flow from said slave clock to said master clock, and, for each intermediary equipment, the refined number $K'_{ij}$ of successive packets of the first group, refined number $N'_{ij}$ of packets of said second group and the maximum refined packet transit time, as a function of said correlations of instant transit times between packets of said first and second groups, for each of said intermediary equipments and for each of said first and second flows.

6. The method of claim 3, wherein within said step (iii) for each of said chosen first and second flows, a corresponding total transit time is calculated for all of said intermediary equipments, by adding together said respective maximum packet transit times, in order to transmit to at least one of said master clock and said slave clock, these two totaled transit times so that at least one of said master clock and said slave clock can correct an asymmetry in the transmission times of the synchronization packets of said first and second flows.

7. The method of claim 1, wherein within said step (ii) the packets of the chosen flow within said master clock are filtered in order to synchronize said slave clock to said master clock by means of the processed packets of the second group of that chosen flow.

8. The method of claim 1, wherein within said step (ii) in at least one of said master and slave clocks the synchronization packets that feature a variation in transmission time comprised within a chosen interval are determined.

9. An intermediary equipment of a packet-switched network synchronized using master and slave clocks exchanging synchronization packet flows with one another via one or more of said intermediary equipments each intermediary equipment comprising:

a device being operative to perform the steps of:

determining within one of said intermediary equipments instant transit times of packets belonging to a first group of packets of at least one chosen flow of synchronization packets; and determining a maximum transit time of the packets based on said instant transit times, then to act on packets of a second group of that flow's packets so that said instant transit times within said intermediary equipment is within 10 microseconds of said corresponding maximum transit time.

10. The intermediary equipment of claim 9, wherein the device is further operative to determine for its intermediary equipment a number $K_{ij}$ of successive packets of the chosen flow's said first group, which are to be used to determine an instant transit time representative of the instant transit times of the packets of said chosen flow's said second group, and a number $N_{ij}$ of packets of the chosen flow's said second group, which are to be processed, as a function of a correlation of instant transit times between packets of said chosen flow's first and second groups.

11. The intermediary equipment of claim 10, wherein the device is further operative to determine each correlation of instant transit time between packets of each chosen flow for its intermediary equipment.

12. A network node in a packet-switched network synchronized using master and slave clocks exchanging synchronization packet flows with one another via intermediary equipments of said network said network node further comprising:

a slave clock; and said device being operative to:

filter packets belonging to a group of packets of a chosen flow, received at least by said slave clock and having been processed by each intermediary equipment so that said instant transit time within each intermediary network equipment is within 10 microseconds of a maximum transit time, in order to enable a synchronization of said slave clock to said master clock by means of said packets of said group.

13. The network node of claim 12, wherein the device is further operative to determine for said slave clock the synchronization packets that feature a variation in transmission time comprised within a chosen interval.

14. A management equipment for synchronizing master and slave clocks of a packet-switched network, said master and slave clocks exchanging synchronization packet flows with one another via intermediary equipments of said network that are connected to one another, said management equipment comprising:

a device being operative to:

determine, for each intermediary equipment and for each chosen flow, a refined number $K'_{ij}$ of successive packets of a first group, a refined number $N'_{ij}$ of packets of a second group and a maximum refined packet transit time, by analyzing a correlation in instant transit times between packets of said first and second groups of the chosen flow within the intermediary equipment in question, in order for these refined numbers K'ij and N'ij and each maximum refined packet transit time is used within said intermediary equipments of said chosen flow.

15. The management equipment of claim 14 wherein the device is further operative to determine a first transmission frequency of a first frequency of transmission of a first type of synchronization message within a first chosen flow from said master clock to said slave clock, a second transmission frequency of a second type of synchronization message within a second chosen flow from said slave clock to said master clock, and, for each intermediary equipment, the refined number K'ij of successive packets of the first group, the refined number N'ij of packets of said second group and the maximum refined packet transit time, as a function of said correlations of instant transit times between packets of said first and second groups, for each of said intermediary equipments and for each of said first and second flows.

16. A system for synchronizing master and slave clocks of a packet-switched network, said master and slave clocks exchanging synchronization packet flows with one another via intermediary equipments of said network that are connected to one another, said system comprising:
first devices respectively associated with said intermediary equipments, said first devices operative to determine within one of said intermediary equipments instant transit times of packets belonging to a first group of packets of at least one chosen flow of synchronization packets, said device being further operative to determine a maximum transit time of the packets based on said instant transit times, then to act on packets of a second group of that flow's packets so that said instant transit times within said intermediary equipment is within 10 microseconds of said corresponding maximum transit time;
second devices respectively associated with said master and slave clocks, said second devices operative to filter packets belonging to said second group of packets of a chosen flow, received at least by said slave clock and having been processed by each intermediary equipment so that said instant transit time within each intermediary network equipment is within 10 microseconds of said maximum transit time, in order to enable a synchronization of said slave clock to said master clock by means of said packets of said second group; and
a third device coupled to said intermediary equipments, to said master clock and said slave clock, said third device operative to determine, for each intermediary equipment and for each chosen flow, a refined number K'ij of successive packets of said first group, a refined number N'ij of packets of said second group and a maximum refined packet transit time, by analyzing a correlation in instant transit times between packets of said first and second groups of the chosen flow within the intermediary equipment in question, in order for these refined numbers K'ij and N'ij and each maximum refined packet transit time to be used within said intermediary equipments of said chosen flow.

17. The system of claim 16, wherein the first device is operative to determine for its intermediary equipment a number Kij of successive packets of the chosen flow's said first group, which are to be used to determine an instant transit time representative of the instant transit times of the packets of said chosen flow's said second group, and a number Nij of packets of the chosen flow's said second group, which are to be processed, as a function of a correlation of instant transit times between packets of said chosen flow's first and second groups.

18. The system of claim 17, wherein the first device is operative to determine each correlation of instant transit time between packets of each chosen flow for its intermediary equipment.

19. The system of claim 16, wherein the second device is operative to determine for said slave clock the synchronization packets that feature a variation in transmission time comprised within a chosen interval.

20. The system of claim 16, wherein the third device is operative to determine a first transmission frequency of a first frequency of transmission of a first type of synchronization message within a first chosen flow from said master clock to said slave clock, a second transmission frequency of a second type of synchronization message within a second chosen flow from said slave clock to said master clock, and, for each intermediary equipment, the refined number K'ij of successive packets of the first group, the refined number N'ij of packets of said second group and the maximum refined packet transit time, as a function of said correlations of instant transit times between packets of said first and second groups, for each of said intermediary equipments and for each of said first and second flows.

* * * * *